United States Patent
Holmes

(10) Patent No.: US 10,725,996 B1
(45) Date of Patent: Jul. 28, 2020

(54) METHOD AND SYSTEM FOR DETERMINING DIFFERING FILE PATH HIERARCHIES FOR BACKUP FILE PATHS

(71) Applicant: EMC IP Holding Company LLC, Hopkinton, MA (US)

(72) Inventor: Dennis Holmes, San Jose, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 426 days.

(21) Appl. No.: 13/717,929

(22) Filed: Dec. 18, 2012

(51) Int. Cl.
*G06F 16/23* (2019.01)

(52) U.S. Cl.
CPC ................. *G06F 16/2308* (2019.01)

(58) Field of Classification Search
CPC ......... G06F 17/30212; G06F 17/30221; G06F 17/30306; G06F 17/30893; G06F 17/30; G06F 17/30194; G06F 17/30386; G06F 17/30578; G06F 17/30079; G06F 17/30227; G06F 17/30076; G06F 17/30156; G06F 17/30188; G06F 17/30067; G06F 17/30008; G06F 11/1469; G06F 11/1458; G06F 11/1451; G06F 11/1461; G06F 11/1464; G06F 16/2308; G06F 16/183; G06F 16/176; G06F 16/1844; G06F 16/2365; G06F 16/1774; G06F 16/178; G06F 16/119; G06F 16/13; G06F 16/26; G06F 16/93; G06F 16/11; G06F 16/182; G06F 16/17; G06F 16/185; G06F 16/27; G06F 16/951; G06F 16/18; G06F 16/188; G06F 16/955; G06F 16/113; G06F 16/164; G06F 16/2471

USPC ......................... 707/654, 661, 674
See application file for complete search history.

(56) References Cited

U.S. PATENT DOCUMENTS

| | | | | |
|---|---|---|---|---|
| 5,548,639 | A * | 8/1996 | Ogura | H04L 45/00 370/221 |
| 7,032,186 | B1 * | 4/2006 | Gasser | G06F 3/0481 707/999.102 |
| 7,065,516 | B1 * | 6/2006 | Bergan | G09B 7/00 707/687 |
| 7,506,010 | B2 * | 3/2009 | Kulkarni | G06F 11/1451 |
| 7,584,230 | B2 * | 9/2009 | Atchison | |
| 7,668,981 | B1 * | 2/2010 | Nagineni | H04L 41/0896 710/15 |
| 7,926,053 | B1 * | 4/2011 | Rowe | G06F 8/61 702/119 |
| 8,140,791 | B1 * | 3/2012 | Greene | 711/162 |
| 8,396,895 | B2 * | 3/2013 | Miloushev | G06F 17/30091 707/795 |
| 8,935,212 | B2 * | 1/2015 | Titchener | G06F 11/1451 707/654 |
| 2004/0103210 | A1 * | 5/2004 | Fujii et al. | 709/239 |
| 2004/0133577 | A1 * | 7/2004 | Miloushev | G06F 11/1076 |
| 2005/0125464 | A1 * | 6/2005 | Kline | 707/204 |

(Continued)

*Primary Examiner* — Pierre M Vital
*Assistant Examiner* — Andalib F Lodhi
(74) *Attorney, Agent, or Firm* — Dergosits & Noah LLP; Todd A. Noah

(57) ABSTRACT

Backup file path determination is described. A request is input from a source device to access a backup file on a storage device. One or more paths to the backup file are output to the source device. A determination whether the backup file is accessible to the source device via a path of the one or more paths is enabled. Access to the backup file is enabled via the path if the backup file is accessible to the source device via the path.

17 Claims, 3 Drawing Sheets

(56) References Cited

U.S. PATENT DOCUMENTS

| | | | |
|---|---|---|---|
| 2005/0131902 A1* | 6/2005 | Saika | G06F 17/30067 |
| 2005/0210080 A1* | 9/2005 | Saika | 707/204 |
| 2006/0259724 A1* | 11/2006 | Saika | G06F 11/1451 |
| | | | 711/162 |
| 2007/0130229 A1* | 6/2007 | Anglin et al. | 707/204 |
| 2012/0159232 A1* | 6/2012 | Shimada et al. | 714/3 |
| 2012/0179835 A1* | 7/2012 | Morris et al. | 709/238 |
| 2012/0185438 A1* | 7/2012 | Giampaolo | G06F 16/188 |
| | | | 707/654 |
| 2013/0018846 A1* | 1/2013 | Zhou et al. | 707/647 |
| 2013/0054535 A1* | 2/2013 | Ledoux et al. | 707/654 |
| 2014/0074790 A1* | 3/2014 | Berman et al. | 707/649 |
| 2014/0081919 A1* | 3/2014 | Matsumoto | G06F 11/3495 |
| | | | 707/652 |

\* cited by examiner

METHOD AND SYSTEM FOR DETERMINING DIFFERING FILE PATH HIERARCHIES FOR BACKUP FILE PATHS

BACKGROUND

If a software error corrupts a database, or if erroneous data updates the database, a database administrator may restore the database to a previous uncorrupted state that does not include the erroneous data. A backup application executes a backup operation either occasionally or continuously to enable this restoration, storing each desired database state (the values of its data and these values embedding in database's data structures) within dedicated backup files on a storage device. When a database administrator decides to return a database to a previous state, the database administrator specifies the desired previous state by identifying a desired point in time when the database was in this state, and instructs the backup application to execute a restore application to restore the corresponding backup files for that state to the database. A database administrator may reduce the amount of backup data periodically stored to a storage device by configuring the database system to provide an incremental backup, which occurs only when files and directories that are modified after a previous backup are copied from the database's source device to the storage device.

BRIEF DESCRIPTION OF THE DRAWINGS

Advantages of the subject matter claimed will become apparent to those skilled in the art upon reading this description in conjunction with the accompanying drawings, in which like reference numerals have been used to designate like elements, and in which:

DETAILED DESCRIPTION

In the prior art, each source device may use a different path to access backup data files on a storage device, because source devices use different platforms and/or different configurations, and source devices may reside in different parts of a network, or communication system. For example, all of the source devices in a network may not use a uniform local mount point to access a storage device, and source devices in different local area networks may connect to a storage device using different interfaces referenced by different hostnames. The challenge to determine the correct backup file path from a source device to a storage device out of multiple possible paths may be compounded if a backup file path is provided to a source device to use to store backup data on a storage device, and the source device stores the backup data at a different location than the intended location. For example, if the backup file path "C:\AFTD\fileX" is determined to store backup data on a storage device's C drive, and the backup file path "C:\AFTD\fileX" is provided to a source device. The source device may use this backup file path "C:\AFTD\fileX" to create a backup file on the source device's own C drive and store the backup data in this newly created backup file on the source device's own C drive, and not in the intended backup file on the storage device's C drive. In this example, the source device's determination and use of a coincidentally valid but incorrect backup file path results in backup data not being available on the storage device's C drive to restore the backup data to the source device if the data on the source device is corrupted. Therefore, backup file path determination is a challenge in the prior art.

Embodiments herein determine suitable backup file paths for source devices to store backup data on a storage device, even when source devices in a network have different network topologies and differing protocols. An intermediate server inputs a request from a source device to access a backup file on a storage device. The intermediate server may filter all paths to the backup file based on the source device's platform and capabilities to identify one or more suitable paths from the source device to the backup file, and output one or more suitable paths to the backup file to the source device. The intermediate server enables the source device to determine whether the backup file is accessible to the source device via a path of the one or more suitable paths. The intermediate server enables the source device to access the backup file via any suitable path that is determined to be an accessible path. The intermediate server provides greater flexibility by returning multiple suitable paths to the backup file to the requesting source device.

Figure 1:
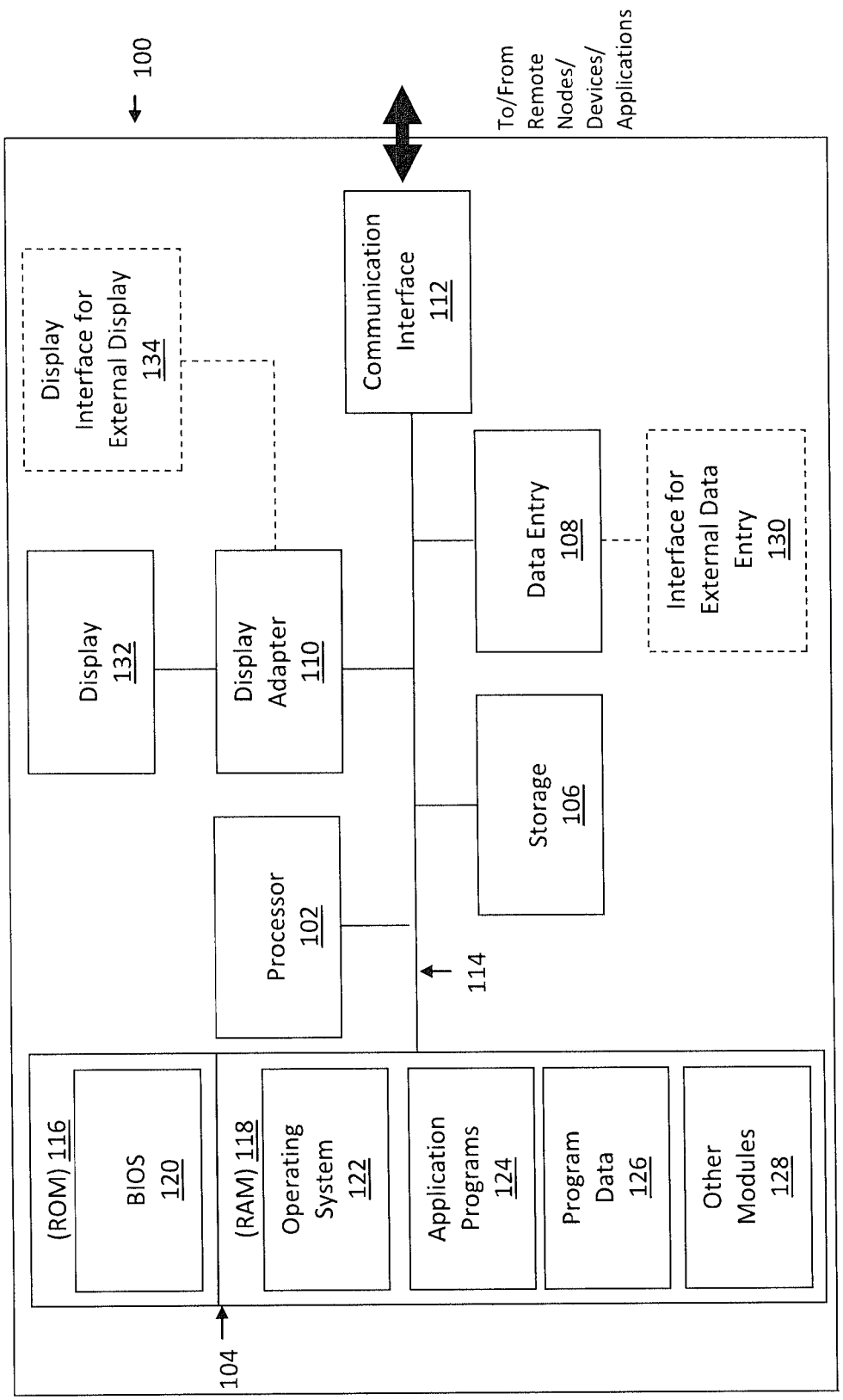
FIG. 1 is a block diagram illustrating an example hardware device in which the subject matter may be implemented.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, data entry module 108, display adapter 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106 and/or received via data entry module 108.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128. A user may enter commands and information into the hardware device 100 through data entry module 108. Data entry module 108 may include mechanisms such as a keyboard, a touch screen, a pointing device, etc. Other external input devices (not shown) are connected to the hardware device 100 via external data entry interface 130. By way of example and not limitation, external input devices may include a microphone, joystick, game pad, satellite dish, scanner, or the like. In some embodiments, external input devices may include video or audio input devices such as a video camera, a still camera, etc. Data entry module 108 may be configured to receive input from one or more users of device 100 and to deliver such input to processing unit 102 and/or memory 104 via bus 114.

A display 132 is also connected to the bus 114 via display adapter 110. Display 132 may be configured to display output of device 100 to one or more users. In some embodiments, a given device such as a touch screen, for example, may function as both data entry module 108 and display 132. External display devices may also be connected to the bus 114 via external display interface 134. Other peripheral output devices, not shown, such as speakers and printers, may be connected to the hardware device 100.

The hardware device 100 may operate in a networked environment using logical connections to one or more remote nodes (not shown) via communication interface 112. The remote node may be another computer, a server, a router, a peer device or other common network node, and typically includes many or all of the elements described above relative to the hardware device 100. The communication interface 112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context. In an embodiment, the computer system 100 includes one or more methods for backup file path determination.

In the prior art, each source device may use a different path to access backup data files on the storage device, because source devices may use different platforms and/or different configurations, and may reside in different parts of a network, or communication system. Embodiments herein determine suitable paths for source devices to store backup data on a storage device, even when source devices in a network have different network topologies and differing protocols. An intermediate server provides greater flexibility by returning multiple suitable paths to the backup file to any requesting source device.

Figure 2:
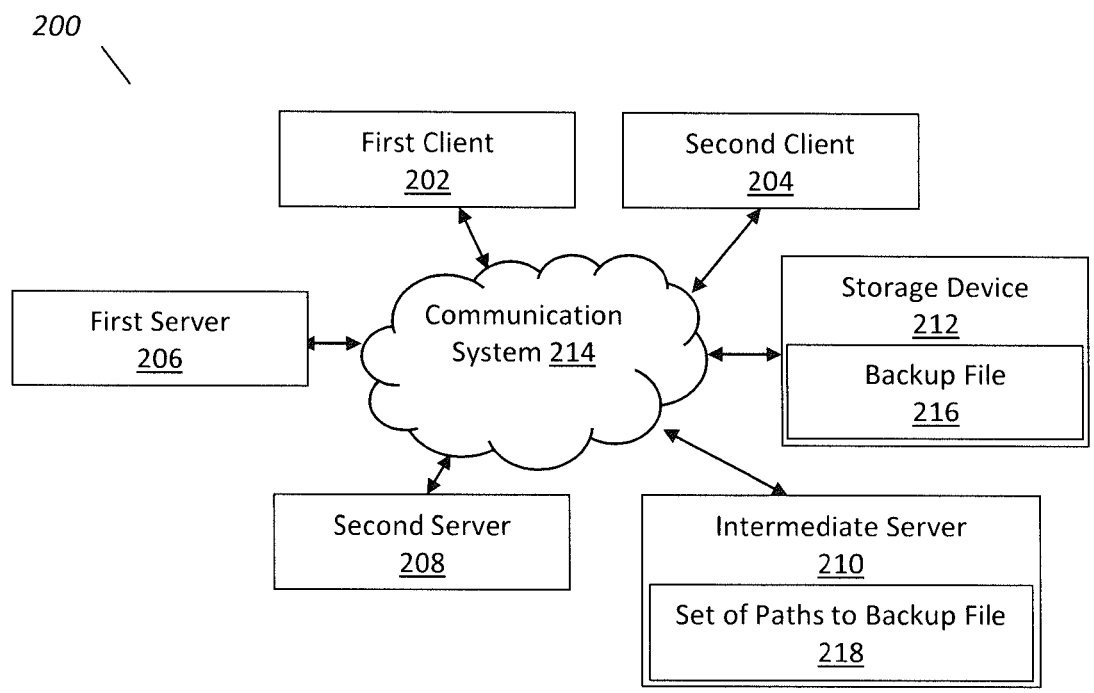
FIG. 2 illustrates a block diagram of an example system for backup file path determination, under an embodiment.

FIG. 2 illustrates a block diagram of a system that implements backup file path determination, under an embodiment. As shown in FIG. 2, system 200 may illustrate a cloud computing environment in which data, applications, services, and other resources are stored and delivered through shared data-centers and appear as a single point of access for the users. The system 200 may also represent any other type of distributed computer network environment in which servers control the storage and distribution of resources and services for different client users.

In an embodiment, the system 200 represents a cloud computing system that includes a first client 202 and a second client 204, and a first server 206 and a second server 208 that are provided by a hosting company. The clients 202-204 and the servers 206-208 communicate with an intermediate server 210 and a storage device 212 via a communication system 214. The communication system 214 enables the system components 202-212 to communicate through a network, direct attach, or a combination of a network and direct attach. The storage device 212 includes a backup file system 216. The intermediate server 210 includes a set of paths to the backup file system 218. Although FIG. 2 depicts the system 200 with two clients 202-204, two servers 206-208, one intermediate server 210, one storage device 212, one communication system 214, one backup file 216, and one set of paths to the backup file 218, the system 200 may include any number of clients 202-204, servers 206-208, intermediate servers 210, storages device 212, communication systems 214, backup files 216, and sets of paths to the backup file 218. The clients 202-204 and the servers 206-208 may each be substantially similar to the system 100 depicted in FIG. 1.

A backup file is optionally created on storage device. The intermediate server 210 creates the backup file 216 on the storage device 212, and identifies the path to the backup file 216. Subsequently, any source device attempting to access the backup file 216 confirms the existence of the backup file 216 using the path provided by the intermediate server 210 before attempting to access the backup file 216. Limiting the creation of the backup file 216 to the intermediate server 210 prevents the prior art problems created by the source device's use of a coincidentally valid but incorrect path to create its own backup file in an unintended storage location. The intermediate server 210 generates a filename for the backup file 216 and a path to the backup file 216, such that the filename and the path are unique within the backup application's scope.

Direct file access enables source devices to bypass communication of backup data through an intermediate server to and from a storage device by enabling the source devices to communicate backup data directly to and from the storage device without communicating the backup data through the intermediate server. In networks with direct file access, source devices such as clients and servers have the capability to directly access backup data on a storage device. In networks without direct file access, source devices lack the capability to directly store backup data on a storage device. For example, the intermediate server 210 creates the backup file 216 on the storage device 212 for the first client 202 to use direct file access to store incremental backup data in the backup file 216 on the storage device 212. In another example, the intermediate server 210 creates the backup file 216 on the storage device 212 and stores backup data for the first server 206 on the storage device 212.

A request to access a backup file on a storage device is input from a source device. For example, the intermediate server 210 inputs a request from the first client 202 to use direct file access to write incremental backup data to the backup file 216 on the storage device 212. In another example, the intermediate server 210 inputs a request from the first server 206 to write full backup data to the backup file 216 on the storage device 212.

One or more paths to a backup file are output to a source device. For example, the intermediate server 210 outputs the set of paths to the backup file 218 to the first client 202. In another example, the intermediate server 210 outputs the set of paths to the backup file 218 to the first server 206. Outputting one or more paths to the backup file may include filtering multiple paths to the backup file 216 based on a source device's platform and/or capabilities to identify the suitable paths to the backup file 218 that are output. For example, the intermediate server 210 filters the full set of paths to the backup file 218 based on the embedded Network File System (NFS) support of the first client 202 that is specified in the request from the first client 202 to write incremental backup data to the backup file 216, and outputs a filtered set of paths to the backup file 218, which are explicit NFS access paths, to the first client 202. The ability to output multiple paths to a source device means that each path, including auto-mounter paths, which might be used by the source device can be specified in the configuration of the storage device.

A determination is made whether a backup file is accessible to a source device via a path of the one or more paths output to a source device. For example, the first client 202 determines whether the backup file 216 is accessible to first client 202 via the path /net/fileserver/AFTD/filenameX of the set of paths to the backup file 218. In another example, the first server 206 determines whether the backup file 216 is accessible to first server 206 via any path of the set of paths to the backup file 218.

The determination whether the backup file is accessible to the source device via a path may include an evaluation of the path based on network topology and/or differing protocols. For example, the first client 202 may evaluate the path/net/fileserver/AFTD/filenameX as a path provided by the intermediate server 210 that is UNIX® based, and convert this path to the path \\fileserver\AFTD\filenameX for the first client 202 that is Windows® based.

The determination whether the backup file is accessible to the source device via a path may include an evaluation of multiple paths of the set of paths to the backup file 218. For example, the intermediate server 210 outputs to the first client 202 the set of paths to the backup file 218 that includes the path \\fileserver1a\AFTD\filenameX, which is the path that corresponds to the first client 202, and the path \\fileserver1b\AFTD\filenameX, which is the path that corresponds to the second client 204. In this example, when the first client 202 determines whether the backup file 216 is accessible via any path of the set of paths to the backup file 218, the first client 202 halts evaluation of paths after identifying the first path in the set of paths to the backup file 218, the path \\fileserver1a\AFTD\filenameX, as a path that enables the first client 202 to access the backup file 216. Continuing this example, when the second client 204 determines whether the backup file 216 is accessible via any path of the set of paths to the backup file 218, the second client 204 continues evaluation after identifying the first path in the set of paths to the backup file 218, the path \\fileserver1a\AFTD\filenameX, as a path that does not enable the second client 202 to access the backup file 216. Further to this example, the second client 204 halts evaluation after identifying the second path in the set of paths to the backup file 218, the path \\fileserver1b\AFTD\filenameX, as a path that enables the second client 202 to access the backup file 216.

If a backup file is accessible to a source device via the path, the source device uses the path to access the backup file. If a backup file is not accessible to a source device via any path, a fallback technique may use another backup/recover data transfer method, and an error message may be output via an intermediate server and/or the source device.

A backup file is accessed via a path. For example, the first client 202 writes incremental backup data to the backup file 216 via the path \\fileserver1a\AFTD\filenameX. In another example, the first server 206 is restored from the backup file 216 via an accessible path of the set of paths to the backup file 218.

Embodiments herein determine suitable paths for source devices to store backup data on a storage device, even when source devices in a network have different network topologies and differing protocols. The intermediate server 210 provides greater flexibility by returning multiple suitable paths to the backup file 218 to the requesting source device.

Figure 3:
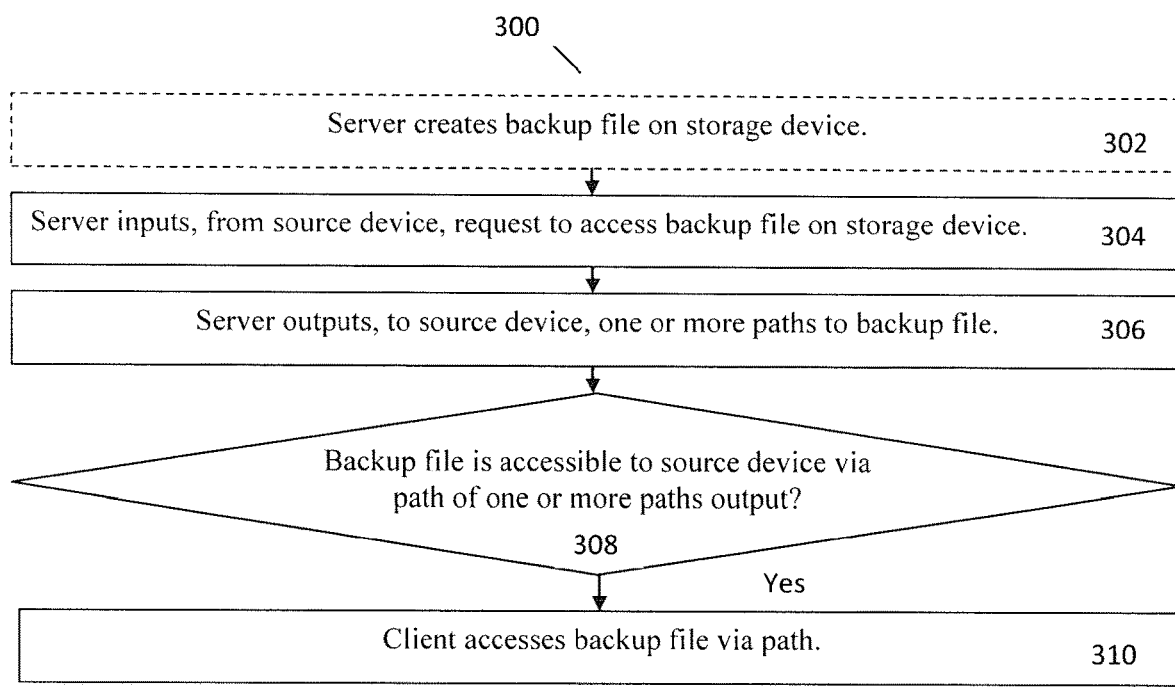
FIG. 3 is a flowchart that illustrates a method of backup file path determination, under an embodiment.

FIG. 3 is a flowchart that illustrates a method of backup file path determination. Flowchart 300 illustrates method acts illustrated as flowchart blocks for certain steps involved in and/or between the client 202-204 and/or the servers 206-208 of FIG. 2.

A backup file is optionally created on storage device, act 302. For example, the intermediate server 210 creates the backup file 216 on the storage device 212 for the first client 202 to store incremental backup data in the backup file 216 on the storage device 212.

A request to access a backup file on a storage device is input from a source device, act 304. For example, the intermediate server 210 inputs a request from the first client 202 to use direct file access to write incremental backup data to the backup file 216 on the storage device 212.

One or more paths to a backup file are output to a source device, act 306. For example, the intermediate server 210 outputs the set of paths to the backup file 218, including the path \\fileserver1a\AFTD\filenameX, to the first client 202.

A determination is made whether a backup file is accessible to a source device via a path of the one or more paths output to the source device, act 308. For example, the first client 202 determines whether the backup file 216 is accessible to first client 202 via the path \\fileserver1a\AFTD\filenameX. If a backup file is accessible to a source device via any path, the flowchart 300 continues to act 310. If a backup file is not accessible to a source device via any path, the flowchart 300 terminates.

A backup file is accessed via a path, act 310. For example, the first client 202 uses direct file access to write incremental backup data to the backup file 216 via the path \\fileserver1a\AFTD\filenameX.

Although FIG. 3 depicts the acts 302-310 occurring in a specific order, the acts 302-310 may occur in another order. Embodiments herein determine suitable paths for source devices to store backup data on a storage device, even when source devices in a network have different network topologies and differing protocols. The intermediate server 210 provides greater flexibility by returning multiple suitable paths to the backup file 216 to the requesting source device.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-

What is claimed is:

1. A system for backup file path determination, the system comprising:
a processor-based system, comprising an application, which when executed on an intermediate server, will cause the processor to:
receive, by the intermediate server, a request from a source device to access a backup file on a storage device, the request excluding any identification of one or more segments of a file path and specifying at most (1) the backup file, (2) the storage device, and (3) at least one of a source device platform and a source device capability, the intermediate server being independent from the storage device;
identify, by the intermediate server, a set of file paths from a plurality of paths to the backup file, in response to the request to access the backup file being inputted, by selecting from the plurality of file paths based on at least one of the source device platform and the source device capability specified in the request from the source device to access the backup file, each respective file path in the identified set of file paths based on a file path segment hierarchy to the backup file, the backup file being accessible via differing file path segment hierarchies represented by other file paths in the identified set of file paths; and
output, by the intermediate server to the source device, the identified set of file paths to the backup file, thereby enabling the source device to determine whether the backup file is accessible to the source device via one of the set of file paths based on at least one of a network topology and a protocol of the source device, and for enabling the source device to access the backup file via the one file path in response to a determination that the backup file is accessible to the source device via the one file path.

2. The system of claim 1, wherein the processor-based application is further configured to create the backup file on the storage device.

3. The system of claim 1, wherein enabling the determination by the source device whether the backup file is accessible to the source device via the one file path comprises enabling an evaluation of the set of file paths based on the at least one of the network topology and the protocol of the source device.

4. The system of claim 1, wherein enabling the determination by the source device whether the backup file is accessible to the source device via the one file path comprises enabling an evaluation of the set of file paths to the backup file output to the source device.

5. The system of claim 1, wherein enabling access to the backup file by the source device comprises at least one of enabling storing of store backup data from the source device to the storage device and enabling restoring of the backup data from the storage device to the source device.

6. The system of claim 1, wherein enabling access to the backup file by the source device comprises enabling the source device to directly access files via the storage device.

7. The system of claim 1, further comprising:
wherein the identified set of file paths at least comprises:
a first file path based on a first file path segment hierarchy and a second file path based on a second file path segment hierarchy, a root of the first file path segment hierarchy being different than a root of the second file path segment hierarchy; and
wherein the same backup file is accessible by both the first file path and the second file path.

8. The system of claim 1, wherein the first file path and the second file path both include a same intermediary file path segment.

9. A computer-implemented method for backup file path determination, the method comprising:
receiving, by an intermediate server, a request from a source device to access a backup file on a storage device, the request excluding any file path and specifying at most (1) the backup file, (2) the storage device, and (3) at least one of a source device platform and a source device capability, the intermediate server being independent from the storage device;
identifying, by the intermediate server, a set of file paths from a plurality of mutually exclusive file paths to the backup file in response to the request to access the backup file being inputted by filtering the plurality of mutually exclusive file paths based on at least one of the source device platform and the source device capability specified in the request from the source device to access the backup file, each respective file path in the identified set of file paths based on a file path segment hierarchy to the backup file, the backup file being accessible via differing file path segment hierarchies represented by other file paths in the identified set of file paths; and
outputting, by the intermediate server to the source device, the identified set of file paths to the backup file, thereby enabling the source device to determine whether the backup file is accessible to the source device via one of the set of file paths based on at least one of a network topology and a protocol of the source device, and for enabling the source device to access the backup file via the one file path in response to a determination that the backup file is accessible to the source device via the one file path.

10. The computer-implemented method of claim 9, further comprising creating the backup file on the storage device; and
wherein enabling the determination by the source device whether the backup file is accessible to the source device via the one file path comprises enabling an evaluation of the set of file paths based on the at least one of the network topology and the protocol of the source device.

11. The computer-implemented method of claim 9, wherein enabling the determination by the source device whether the backup file is accessible to the source device via the one file path comprises enabling an evaluation of the set of file paths to the backup file output to the source device.

12. The computer-implemented method of claim 9, wherein enabling access to the backup file by the source device comprises at least one of enabling storing of backup data from the source device to the storage device and enabling restoring of the backup data from the storage device to the source device.

13. The computer-implemented method of claim 9, wherein enabling access to the backup file by the source device comprises enabling the source device to directly access files via the storage device.

14. A computer program product, comprising a non-transitory computer-readable medium having a computer-readable program code embodied therein, the computer-readable program code adapted to be executed by one or more processors to implement a method for backup file path determination, the method comprising:

receiving, by an intermediate server, a request from a source device to access a backup file on a storage device, the request excluding any file path and specifying at most (1) the backup file, (2) the storage device, and (3) at least one of a source device platform and a source device capability, the intermediate server being independent from the storage device;

identifying, by the intermediate server, a set of file paths from a plurality of mutually exclusive file paths to the backup file in response to the request to access the backup file being inputted by filtering the plurality of mutually exclusive file paths based on at least one of the source device platform and the source device capability specified in the request from the source device to access the backup file, each respective file path in the identified set of file paths based on a file path segment hierarchy to the backup file, the backup file being accessible via differing file path segment hierarchies represented by other file paths in the identified set of file paths; and outputting, by the intermediate server to the source device, the identified set of file paths to the backup file, thereby enabling the source device to determine whether the backup file is accessible to the source device via one of the set of file paths based on at least one of a network topology and a protocol of the source device, and for enabling the source device to access the backup file via the one file path in response to a determination that the backup file is accessible to the source device via the one file path.

15. The computer program product of claim 14, wherein the method further comprises creating the backup file on the storage device; and wherein enabling the determination by the source device whether the backup file is accessible to the source device via the one file path comprises enabling an evaluation of the set of file paths based on the at least one of the network topology and the protocol of the source device.

16. The computer program product of claim 14, wherein enabling the determination by the source device whether the backup file is accessible to the source device via the one file path comprises enabling an evaluation of the set of file paths to the backup file output to the source device.

17. The computer program product of claim 14, wherein enabling access to the backup file by the source device comprises at least one of enabling storing of backup data from the source device to the storage device and enabling restoring of the backup data from the storage device to the source device.

* * * * *